(12) United States Patent
Schwarz et al.

(10) Patent No.: US 11,981,458 B2
(45) Date of Patent: May 14, 2024

(54) SEPARATION SYSTEM FOR A SATELLITE

(71) Applicant: EXOLAUNCH GmbH, Berlin (DE)

(72) Inventors: Peter Schwarz, Salzburg (AT); Johannes Gruber, Salzburg (AT); Peter Wimmer, Pfarrwerfen (AT)

(73) Assignee: EXOLAUNCH GmbH, Berlin (DE)

(*) Notice: Subject to any disclaimer, the term of this patent is extended or adjusted under 35 U.S.C. 154(b) by 147 days.

(21) Appl. No.: 17/631,193

(22) PCT Filed: Nov. 7, 2019

(86) PCT No.: PCT/EP2019/080619
§ 371 (c)(1),
(2) Date: Jan. 28, 2022

(87) PCT Pub. No.: WO2021/089167
PCT Pub. Date: May 14, 2021

(65) Prior Publication Data
US 2022/0258886 A1     Aug. 18, 2022

(51) Int. Cl.
*B64G 1/64*     (2006.01)
(52) U.S. Cl.
CPC ............ *B64G 1/641* (2013.01); *B64G 1/645* (2013.01)
(58) Field of Classification Search
CPC .... B64G 1/645; B64G 1/6455; B64G 1/6457; B64G 1/6459
See application file for complete search history.

(56) References Cited

U.S. PATENT DOCUMENTS

| | | | |
|---|---|---|---|
| 6,354,540 B1 | 3/2002 | Lewis et al. | |
| 2014/0084113 A1* | 3/2014 | Barber | B64G 1/641 244/173.2 |
| 2015/0097085 A1 | 4/2015 | Holemans | |

FOREIGN PATENT DOCUMENTS

| | | | |
|---|---|---|---|
| CA | 3047680 A1 | 6/2018 | |
| CN | 106742081 A | * 5/2017 | |
| CN | 106742081 A | 5/2017 | |
| CN | 106742081 B | 5/2017 | |
| EP | 1944237 B1 | 8/2011 | |
| EP | 2325086 B1 | 5/2012 | |
| EP | 2711300 A2 | 3/2014 | |
| JP | S6422600 U | 2/1989 | |
| JP | 2003080476 A | 3/2003 | |
| JP | 2014065481 A | 4/2014 | |
| JP | 2015074392 A | 4/2015 | |
| JP | 2016084130 A | 5/2016 | |
| JP | 2017515739 A | 6/2017 | |
| WO | 2015176182 A1 | 11/2015 | |

OTHER PUBLICATIONS

Japan Patent Office. Notice of Reasons for Refusal for JP Application No. 2022-517152 and English translation, mailed Jul. 21, 2023, pp. 1-10.

* cited by examiner

*Primary Examiner* — Timothy D Collins
*Assistant Examiner* — Justin Michael Heston
(74) *Attorney, Agent, or Firm* — Vivacqua Crane, PLLC

(57) ABSTRACT

The invention relates to a separation system that dispenses a satellite from a launch vehicle along a dispensing axis, with a first ring for mounting to the launch vehicle and a second ring for mounting to the satellite and a deployment means exerting a separating force on the first and the second ring.

20 Claims, 6 Drawing Sheets

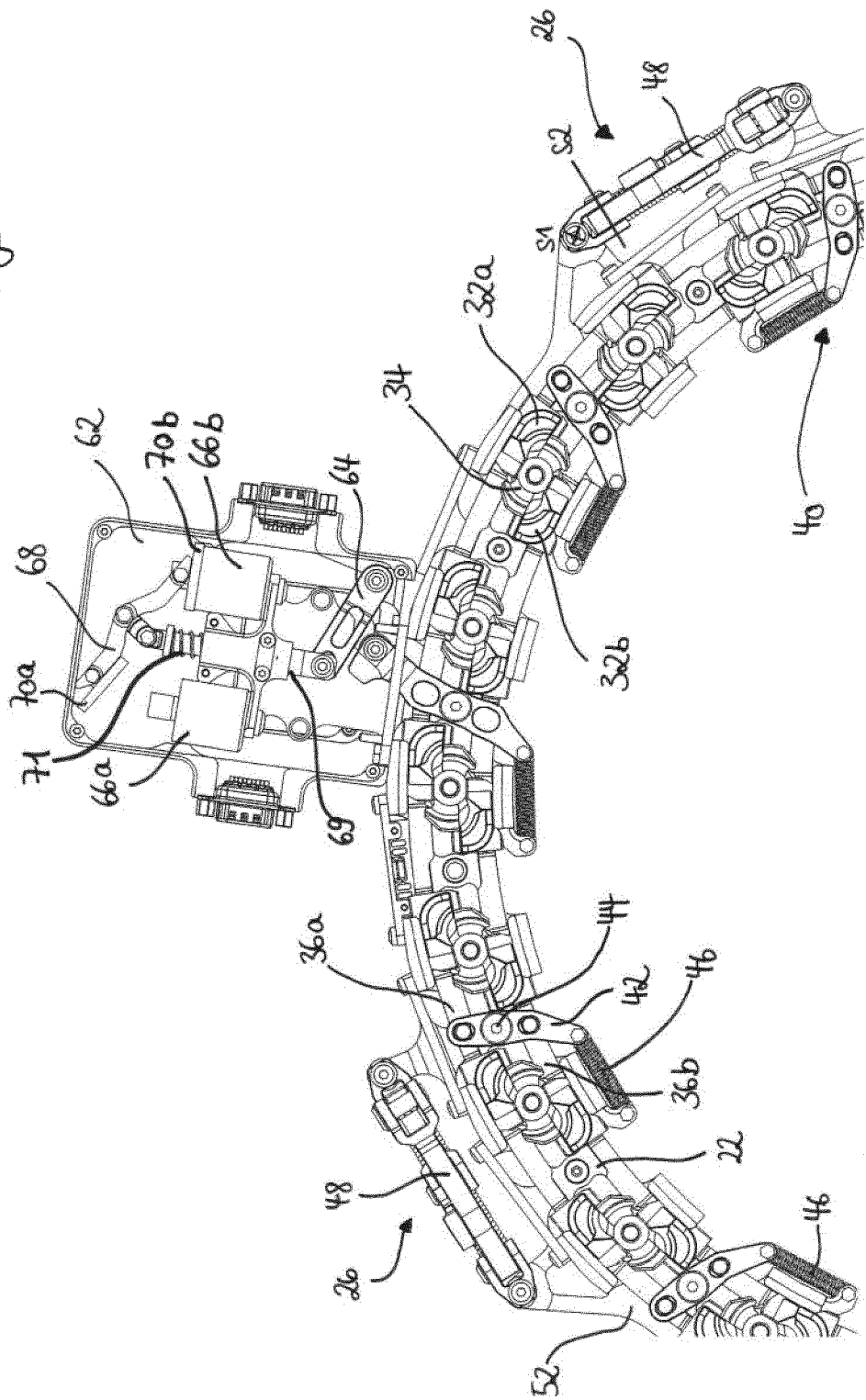

SEPARATION SYSTEM FOR A SATELLITE

This application is a national stage filing under 35 U.S.C. § 371 of international application number PCT/EP2019/080619, filed Nov. 7, 2019. The contents of this application are incorporated herein by reference in their entirety.

The present invention relates to a separation system that dispenses a satellite from a launch vehicle along a dispensing axis, with a first ring for mounting to the launch vehicle and a second ring for mounting to the satellite and a deployment means exerting a separating force on the first and the second ring.

Satellites, in particular microsatellites of up to about 150 kg, are typically transported into orbit by a rocket comprising a launch vehicle and separated from the launch vehicle by a separation system. Known separation systems use a belt-like structure to secure the satellite to the launch vehicle for transport. In orbit, the belt is released, thereby allowing preloaded springs to relax and to dispense the satellite. The springs typically feature a stroke of only about 2 cm. Thus, the stored energy, i.e. the spring force is completely released over a very short travel path, exerting a shock on the satellite. This poses the risk of damaging sensitive satellites, optical payloads and electronic components. It is a further risk of such systems, that in case the holding force is relieved unevenly along the circumference of the separation system, unwanted tilting moments can occur during deployment of the satellite.

It is an object of the present invention to provide a separation system which allows a shock-free, smooth and linear deployment of a satellite from a launch vehicle.

The object is accomplished by a separation system in accordance with claim 1 and in particular in that the separation system comprises a deployment means exerting a separating force on the first and the second ring, wherein the separating force exerted by the deployment means increases upon release. The object is also accomplished by a separation system in accordance with claim 17 and in particular in that the separation system comprises a deployment means that separates the first ring from the second ring by means of at least one spring, wherein said spring is coupled to a lever mechanism which releasably supports the second ring.

According to an embodiment of the present invention a separation system that dispenses a satellite from a launch vehicle along a dispensing axis may comprise a first ring for mounting to the launch vehicle, a second ring for mounting to the satellite, a holding means interconnecting the first ring and the second ring in a holding position, a deployment means exerting a separating force on the first and the second ring, a release means that releases the interconnection of the first and second ring, wherein the separating force exerted by the deployment means increases upon release.

A general idea of the present invention is that deployment of the satellite is initiated with only a minimum separating force in order to ensure smooth acceleration of the satellite. Further increase of the separating force during the deployment process ensures effective dispensing of the satellite into orbit. In this way, a shock-free separation of the satellite from the launch vehicle can be achieved, safeguarding the structural and functional integrity of its components and payload.

In general, other than ring-shaped geometries are possible for the separation system. However, reliable and lightweight components are of prime importance for space applications. A symmetrical ring shape may thus be favourable, as it may require a minimum number of parts and mechanical components. In order to keep the load of the rocket to a minimum, the separation system or a selection of parts thereof, in particular the first ring and the second ring and other rings attached thereto, may be manufactured from extremely light materials, such as carbon-fiber.

The first ring and the second ring are adapted to be mounted to the launch vehicle and the satellite, respectively, along their whole circumference so that the radial plane of the ring may be oriented at least approximately parallel to the mounting surface on the launch vehicle and satellite, respectively. In a holding position, i.e., during transport of the satellite into orbit, the first ring and the second ring can be interconnected with their radial planes oriented parallel to each other by the holding means. The dispensing axis can be oriented at least approximately perpendicular to the radial planes of the rings.

The separation system further comprises a deployment means for exerting a separation force on the satellite and a release means for releasing the interconnection of the first and the second ring. Generally, the deployment and release means can be located on either the first or the second ring. It may be advantageous if both are located on the first ring, as the second ring remains with the satellite after deployment.

The release means is equipped to release the holding position by unlocking the holding means so that the first and the second ring may be separated. The release means may comprise at least one spring or a group of springs. The springs may, for example, be preloaded in the holding position and relax upon initiation of satellite deployment, thereby unlocking the interconnection of the first and second ring by their spring force.

In an embodiment, the deployment means comprises a first group of springs and a second group of springs, the springs of the first group having a spring force which is different as compared to the spring force of the springs of the second group. These two groups of springs can work independently of each other and exert their spring force at different points in time. While the first group of springs may constitute the main actuator of the deployment means to push off the satellite, the second group of springs may act as support actuator, in particular for initiating the deployment process, in particular with a reduced spring force. Thus, the two groups of springs secure a particularly reliable deployment.

In a further embodiment, at least one actuating ring is slidably attached to the first ring. Such an actuating ring can be mounted rotatably around a common centre with the first ring and can thus be movable relative to the first ring, which may be considered a static basis (relative to the launch vehicle). With respect to the dispensing axis the actuating ring can be fixed against axial as well as lateral translational displacements. By providing a slidable rigid actuating ring, actuating movements initiated at one point of the actuating ring are directly transferred by mechanical restricted guidance to every other point of the actuating ring without time delay or attenuation. This ensures immediate response to an actuation around the whole circumference of the actuating ring and thus of the separation system.

In a further development, at least two actuating rings are slidably attached to the first ring, the release means driving said two actuating rings in opposite (circumferential) directions. Two actuating rings can be arranged on opposing sides of the first ring, e.g., on the outside and inside of the radius of the first ring. The at least two actuating rings can be coupled in a way that a movement initiated at one point on one of the actuating rings is transferred by mechanical restricted guidance to every other point on both of the actuating rings, while movement of one of the rings is accompanied by a synchronous movement in the opposite direction of the other actuating ring. The release means can be coupled to the actuating rings actuating their simultaneous movement in opposite directions, e.g., by application of a spring force.

In accordance with a further embodiment of the present invention, the holding means comprises a plurality of holding devices distributed along the circumference of the first and the second ring. This offers the advantage that the interconnection of the first and the second ring can be a multipoint connection, providing a stable link between the first and the second ring while ensuring even distribution and support of the load of the satellite while attached to the launch vehicle. For example, the holding devices may comprise a plurality of coupling devices located on the first ring and a plurality of corresponding coupling pins located on the second ring, which are designed to be taken up and held by the coupling devices in order to establish an interconnection of the two rings.

In a further development, each holding device comprises two coupling brackets moveable in opposite directions. The coupling brackets may be part of the coupling devices on the first ring and they can be connected with the first ring itself or an add-on part thereof, in particular, an actuating ring. The coupling brackets may be movably arranged with respect to the first ring, in particular they may be movable in opposite directions between an open configuration, where they are at a maximum distance from each other and open to release the coupling pins of the second ring, and a closed configuration, where they are at minimum distance from each other and enclose and hold the coupling pins of the second ring. For example, the coupling brackets may be arranged such that they enclose the coupling pins from two opposing sides in the closed configuration, thereby securing them in place.

The coupling brackets may in particular be moved synchronously by means of two actuating rings. For releasing grip on the coupling pins, both coupling brackets can be moved apart by rotation of the two actuating rings in opposite directions. Removing both coupling brackets synchronously ensures release of the holding force evenly around the whole coupling pin, thereby avoiding the introduction of any tilting moments. As all coupling devices can be coupled via the actuating rings, the opening movement simultaneously reaches the coupling brackets of all coupling devices distributed along the circumference of the first ring. Thereby, the second ring can be evenly released without generation of any tilting moments.

In accordance with another embodiment, each coupling device comprises a fixed receptacle between said coupling brackets. The coupling brackets and fixed receptacle together may form a coupling device to take up the coupling pins of the second ring in the holding position. During establishment of a connection between the first and the second ring, the fixed receptacle can help to guide the coupling pins to the correct positions. In a second step, employment of the coupling brackets can ensure a stable connection and also secure the coupling pins against translational movements along the dispensing axis as well as perpendicular to it by enclosing the pins with suitable coupling surfaces.

In a further embodiment, a plurality of operating levers is mounted pivotally at the first ring, the operating levers driving two actuating rings slidably attached to the first ring in opposite directions. The operating levers can be mounted rotatably at a pivot point on the first ring, while opposing arms of the operating levers are connected to the actuating rings, thereby simultaneously driving them in opposite directions. For example, one operating lever may be associated with each coupling device of the separation system, thereby ensuring smooth operation of the actuating rings around the whole circumference of the first ring. A movement of the operating levers can, e.g., be introduced by a spring or a group of springs, for example one spring per operating lever, of the release means.

In another embodiment, the separation system comprises a starter mechanism, which is coupled to one of the operating levers, said starter mechanism actuating said operating lever. The starter mechanism can be designed to initiate the separation process of the satellite from the launch vehicle. The starter mechanism may, in particular, release the operating lever causing a preloaded spring of the release means associated with this operating lever to relax. Also other springs of the release means may then be free to relax at the same time and the energy stored in the springs may be converted by the operating levers into a sliding movement of the actuating rings, in particular in opposite circumferential directions. Immediate and non-attenuated transmission of this movement around the whole separation system can be safeguarded via restricted mechanical coupling by means of the actuating rings, thereby even increasing the reliability of the separation mechanism.

In accordance with a further development, the deployment means comprises a plurality of lever mechanisms each comprising a first lever and a second lever pivotally connected to each other. The first and second lever may thus form a scissor-like lever mechanism. The first and/or second lever may exhibit a kinked shape or a straight shape in order to optimize the force transmission of the lever mechanism. It can be beneficial to arrange the lever mechanism outside the first ring due to spatial requirements, while it is generally also possible to arrange it inside of the first ring as well.

The lever mechanisms can be designed in a way, that a first end of the first lever and a first end of the second lever are fixed to the first ring or to components attached to the first ring. Each lever mechanism can feature at least one point for establishing contact with the second ring, in order to exert a separating force onto it. The contact point with the second ring can, for example, be located on the second end of the first lever and/or the second end of the second lever. The second ends of the first and second lever can each be located on the respective lever arm beyond the pivot point of the lever mechanism as viewed from the first ends of the first and second lever.

As deployment of the satellite occurs along the dispensing axis, the effective movement of the contact point of the lever mechanism with the second ring can be directed along the dispensing axis as well. In a deployment position, the second ends of the first and second lever can thus be at a maximum distance from the plane of the first ring, the whole lever mechanism resembling an X-like shape or an inverted Y-like shape.

In a holding position, the lever arms of the first lever and the second lever can be at least approximately aligned with each other, the whole lever mechanism resembling the shape of closed scissors. In this position, the lever mechanism can be at least approximately in an equilibrium position. The pivot point and the first ends of the first and second lever can be almost located on a straight line.

Upon actuating the lever mechanism between the closed scissors and the X-like position, the distance between the first ends of the first and second lever, which are located at least approximately in the plane of the first ring, changes.

The first end of one of the first or the second lever can be fixed on the first ring, while the other can be mounted movably relative to the first ring. The movement can be restricted such, that a connecting line between the first ends of the first and second lever remains tangential to the first ring at all times.

In order to ensure, that the separating force is exerted evenly distributed over the whole circumference of the separation system, several lever mechanisms can be arranged around the circumference of the first ring. For example, several lever mechanisms can be evenly distributed around the circumference of the first ring.

In another embodiment, a first group of springs connects the first ring and an actuating ring slidably attached to the first ring. Any movement induced at any point of the actuating ring is without time delay or attenuation transferred to all other points of the actuating ring. As the first group of springs is part of and may drive the deployment means, a movement of the deployment means, e.g., a movement of a lever mechanism, can be forwarded over the whole actuating ring. This ensures a simultaneous actuation of all deployment means, which helps to avoid any tilting moments during deployment.

In a further embodiment, in the holding position a starter spring arranged on one of the first and the second lever exerts a spring force onto the other of the first and the second lever. This second group of springs acts independently of any other component of the deployment means, assisting initiation of deployment. As the lever mechanism may be close to equilibrium in the holding position, the additional spring force exerted by the second group of springs can ensure reliable triggering of the deployment means.

In the holding position, the lever arms of the first and the second lever can be closely aligned with each other. The starter spring can be arranged in a lever arm of the first and/or second lever, such that it is pushed together, i.e. preloaded, by the adjacent lever arm of the other lever. Pushing back, the starter spring exerts the resulting spring force onto the adjacent lever arm.

The starter spring of another embodiment is arranged in a tangential plane of the first ring. While a longitudinal spring axis of the starter spring or the group of starter springs may change orientation during deployment of the separation system, the reorientation of the spring axis can be confined to a tangential plane of the first ring or to a plane parallel to a tangential plane of the first ring. Thus, the spring force is directed to the lever mechanism with maximum efficiency.

In another embodiment, the first end of the first lever and the first end of the second lever are each mounted swivelling around two perpendicular axes. One of these axes can be parallel to the dispensing axis, while the other can be parallel to the plane of the first ring. In this way, the scissor-like lever mechanism can work unrestricted, enabling changes in the distance between the first end of the first lever and the first end of the second lever in the plane of the first ring as well as changes of the angles between the first lever and the second lever and the plane of the first ring. A strain-free and low-loss operation of the lever mechanism and thus force-efficient deployment of the satellite becomes possible.

According to a further development, the longitudinal axis of each spring is arranged tangentially to the first ring. While the longitudinal axes of the first or the second or both of the groups of springs may be arranged in a tangential plane of the first ring, a group of springs, e.g. the first group of springs of the deployment means, can also be arranged with their longitudinal axes parallel to the plane of the first ring and tangential to the first ring.

As the dispensing axis is at least approximately perpendicular to the latter direction, the spring force has to be redirected by a certain means, e.g., by a lever mechanism, in order to deploy the satellite. The redirection of the spring force can beneficially occur in a way that the separating force exerted by the deployment means increases upon release of the satellite.

Alternatively or additionally, also spring elements of the release means of the separation system can be oriented with the longitudinal axis of each spring arranged tangentially to the first ring. Alternatively, the axes of the springs of the release means may also be arranged parallel to a tangential orientation, e.g., inside the first ring.

In a further embodiment, a maximum travel or stroke of the second ring with respect to the first ring along the dispensing axis between the holding position and a release position is at least 4 cm, preferably at least 6 cm, and in particular up to 8 cm upon deployment. Such a stroke is large as compared to the state-of-the-art and allows transferring the separation force onto the satellite over a longer travel, leading to a less forceful acceleration of the satellite. In particular, the travel of the deployment means along the dispensing axis may be greater than a spring travel of a spring operating the deployment means. In combination with the separating force exerted by the deployment means increasing upon release of the satellite, a smooth acceleration and thus shock-free deployment of the satellite can be achieved.

Another aspect of the present invention, which can, however, be combined with the above-described subjects, is a separation system for dispensing a satellite from a launch vehicle along a dispensing axis, which comprises a first ring for mounting to the launch vehicle, a second ring for mounting to the satellite, a holding means interconnecting the first ring and the second ring in a holding position, a deployment means that separates the first ring from the second ring by means of at least one spring, a release means that releases the interconnection of the first and second ring, wherein said spring is coupled to a lever mechanism which releasably supports the second ring.

The general idea of this aspect of the present invention is that a separation force exerted by a spring does not act directly between the first and the second ring, but is applied to the satellite via a lever mechanism. Thereby, the power development of the spring force can be influenced by the design of the lever mechanism and in particular, a guided and smooth acceleration of the satellite over a long travel and with minimal initial force can be realized. The lever mechanism may comprise a plurality of levers or groups of levers.

All advantages according to the first aspect of the invention can be achieved with this aspect of the invention as well.

In an embodiment, all levers of the lever mechanism are coupled via mechanical restricted guidance. Thus, the movement of one lever of the lever mechanism is transferred without time delay and without attenuation to all levers of lever mechanism, ensuring simultaneous and synchronous exertion of a separating force by the deployment means onto the second ring.

In a further development, a travel of a lever of the lever mechanism along the dispensing axis is greater than a travel of the spring. Thus, the spring force is transmitted to the second ring by the lever mechanism while extending the travel over which the spring force is exerted, thereby providing less forceful application of the spring force to the deployment means and thus to the satellite.

In another embodiment, a separating force exerted by the deployment means increases upon release. The lever mechanism can be designed in a way to transmit low force to the deployment means in the beginning of satellite deployment, while the force transmitted to the deployment means increases over the deployment process. Thereby, smooth acceleration of the satellite is ensured, which is beneficial for keeping the structural and functional integrity of sensitive equipment intact.

Further embodiments of the invention can be seen from the claims, from the description and from the drawings. The invention will be explained only by way of example in the following with reference to schematic drawings.

FIG. 6 shows a top view of the starter mechanism of FIG. 5 in a release position.

The Figures illustrate a separation system 20 comprising a first ring 22 configured to be mounted to a launch vehicle and thereby forming a stationary basis relative to the launch vehicle, and a second ring 24 configured to be mounted to a satellite and movable with respect to the first ring 22 and releasable therefrom. The central axes of the first ring 22 and the second ring 24 define a dispensing axis D along which the satellite is to be dispensed in orbit.

Figure 1:
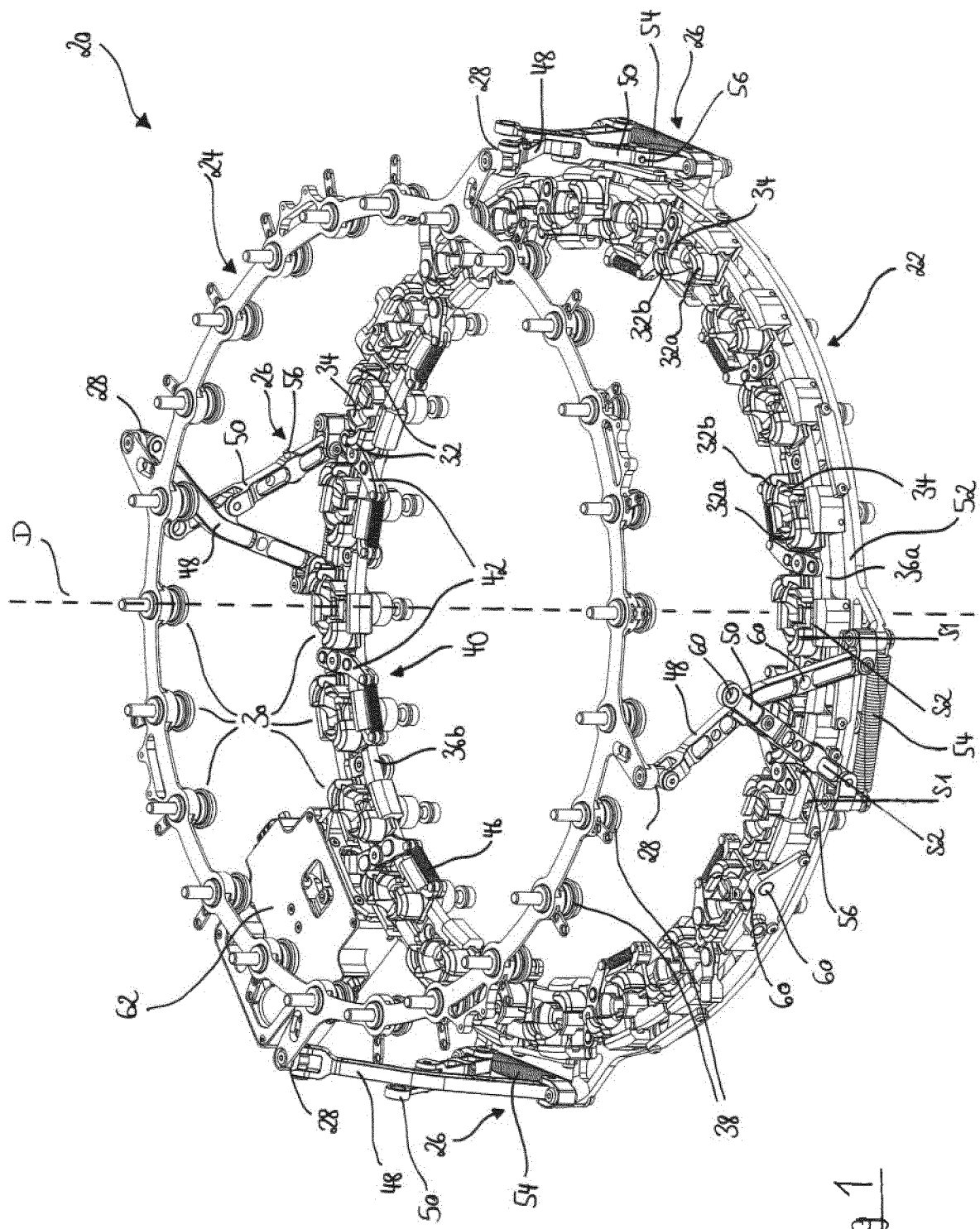
FIG. 1 shows a perspective top view of a separation system in a release state.

FIG. 1 shows the separation system 20 in a release state. This is also the state on earth prior to bringing the separation system 20 into a transport state in which the first ring 22 and the second ring 24 are tightly packed (FIG. 4) and coaxially arranged. In the release state, the second ring 24 is supported only by deployment means 26 of the first ring 22 at contact sites 28.

For holding the first ring 22 and the second ring 24 in the tightly packed transport state, the separation system 20 comprises a holding means. The holding means comprises a plurality of holding devices 30 distributed along the circumference of the separation system 20, each holding device 30 including complementary counterparts arranged on the first ring 22 and the second ring 24. Each holding device 30 comprises a coupling pin 38 located on the second ring 24 and a complementary coupling device located on the first ring 22. Each coupling device includes two coupling brackets 32a and 32b, which are movable in opposite directions along the first ring 22, and a fixed receptacle 34 located between the coupling brackets 32a, 32b. In the release state, as shown in FIG. 1, the coupling brackets 32a, 32b are at a maximum distance from each other (FIG. 6).

Figure 2:
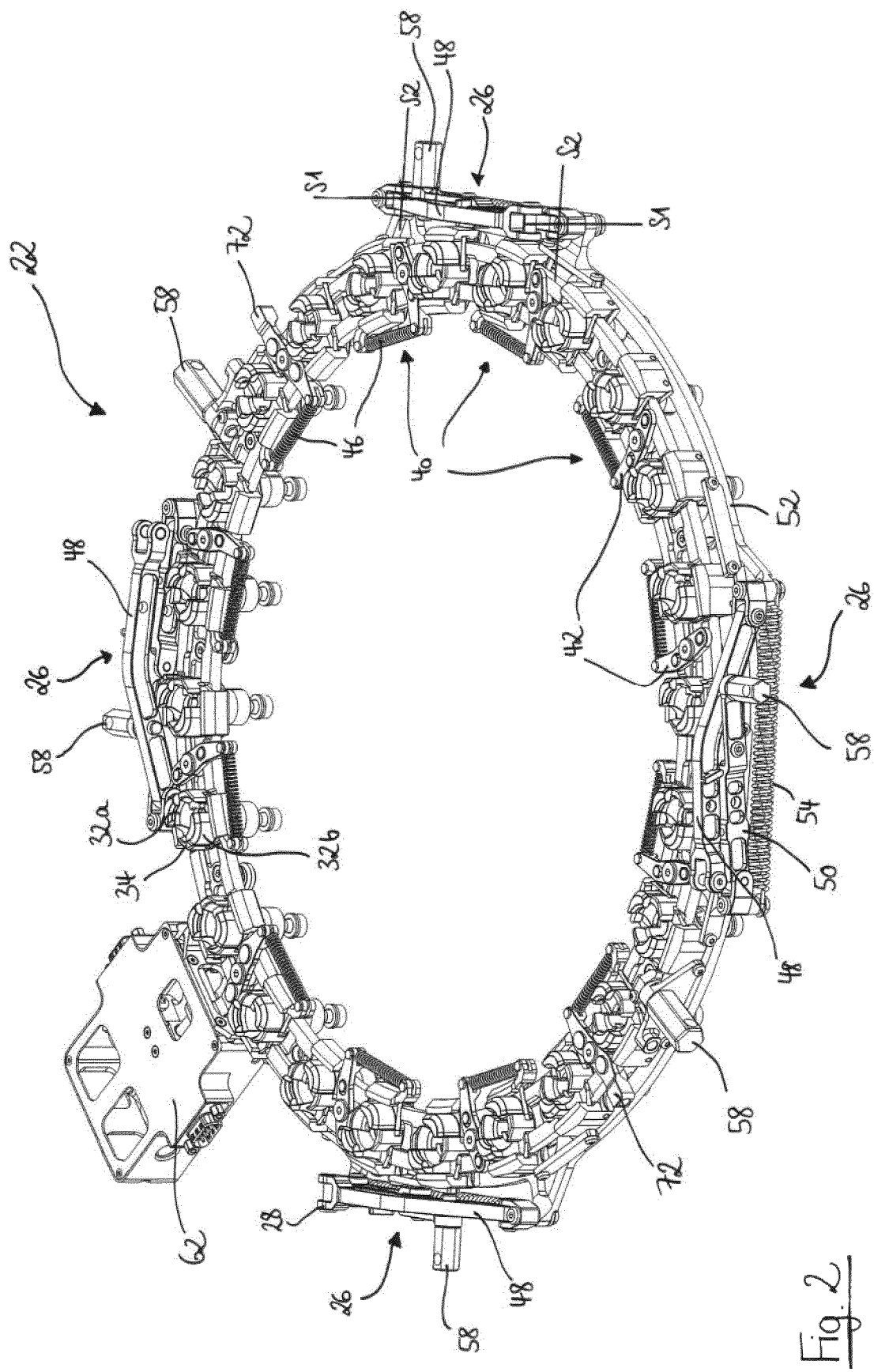
FIG. 2 shows a perspective top view of a part of the separation system of FIG. 1 configured to be mounted to the launch vehicle in a holding position.
Figure 5:
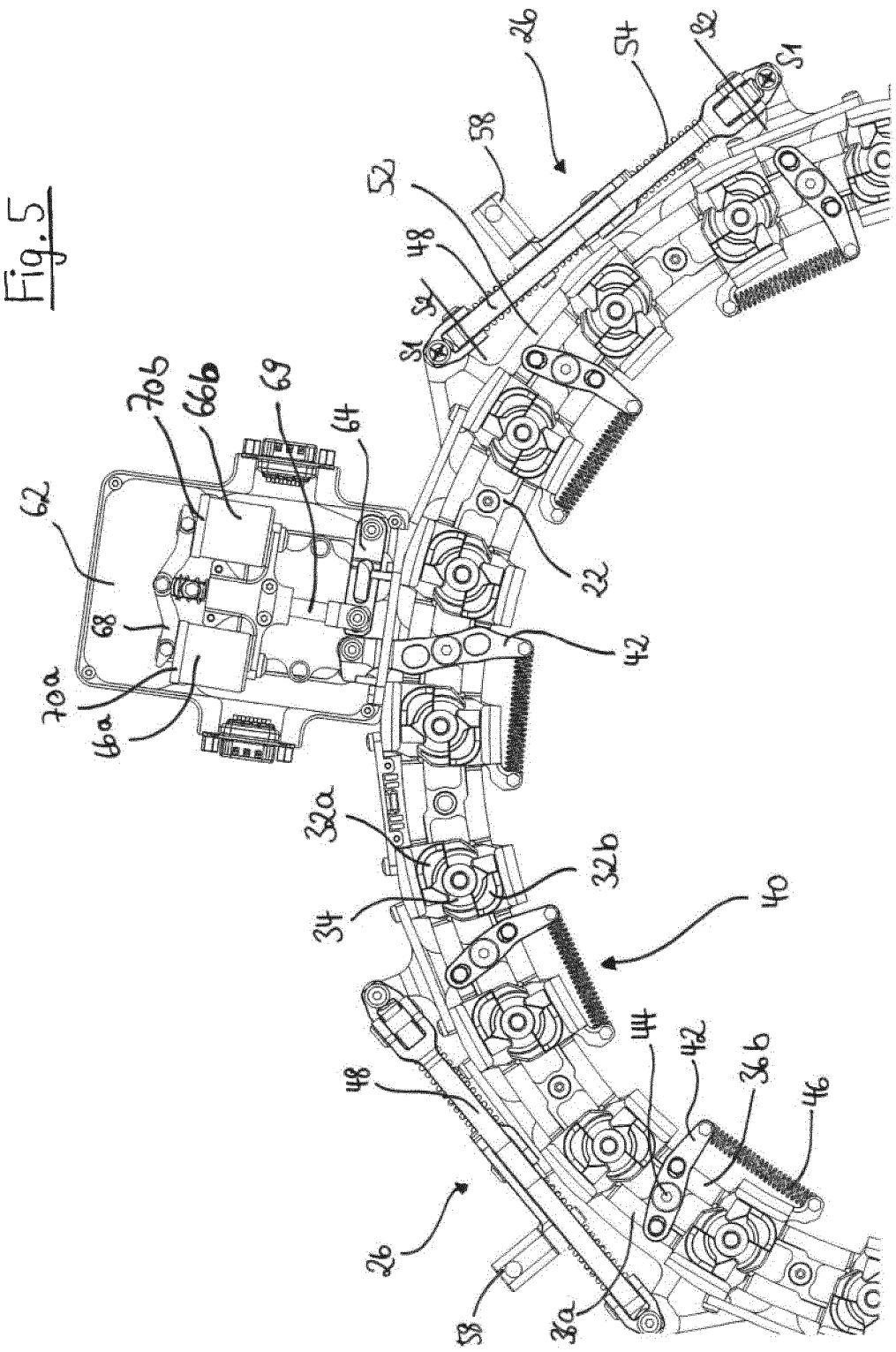
FIG. 5 shows a top view of a starter mechanism in a holding position.

The fixed receptacle 34 is arranged on the first ring 22. The coupling brackets 32a, 32b are arranged on separate actuating rings, i.e. on an outer actuating ring 36a and an inner actuating ring 36b, which are rotatably attached to and coaxially arranged with the first ring 22. By rotation of the actuating rings 36a and 36b in opposite circumferential directions, the coupling brackets 32a and 32b can be moved synchronously between an open configuration as shown in FIGS. 1 and 6, and a closed configuration as shown in FIGS. 2 and 5.

In their open configuration, the coupling devices can receive the corresponding coupling pins 38 of the second ring 24, which are arranged along the circumference of the second ring 24 and aligned with the positions of the coupling devices on the first ring 22, in order to bring the separation system 20 into the transport state. During deployment of the satellite in orbit, the coupling pins 38 of the second ring 24 can be released from the coupling devices in their open configuration.

The coupling pins 38 may have various shapes. As shown in FIG. 1 they may exhibit a knob-like shape, which is designed to be enclosed by and held in position by corresponding coupling surfaces of the coupling brackets 32a, 32b in their closed configuration.

Operation of the outer and inner actuating rings 36a and 36b and thus of the coupling brackets 32a, 32b is effected by a release means 40. The release means 40 comprises a plurality of two-armed operating levers 42 pivotally mounted on the first ring 22 at respective pivots 44. An inner arm of each operating lever 42 is connected to the inner actuating ring 36b and an outer arm of each operating lever 42 is connected to the outer actuating ring 36a, thereby driving the actuating rings 36a and 36b in opposite circumferential directions when pivoting around the pivot 44. This is best seen when comparing FIG. 5 and FIG. 6.

The release means 40 further comprises a plurality of release springs 46, each of which is coupled to and designed to actuate a respective operating lever 42. In the release position as shown in FIGS. 1 and 6, the release springs 46 are in a relaxed position, which establishes a lever position of the operating levers 42 corresponding to an open configuration of the coupling brackets 32a, 32b.

For dispensing the satellite in orbit, the separation system 20 comprises a deployment means 26 exerting a separating force on the first ring 22 and the second ring 24.

The deployment means 26 comprises a plurality of lever mechanisms each comprising a first lever 48 and a second lever 50 pivotally connected to each other at a central pivot 49, such that each lever mechanism has a scissor-like shape.

Figure 4:
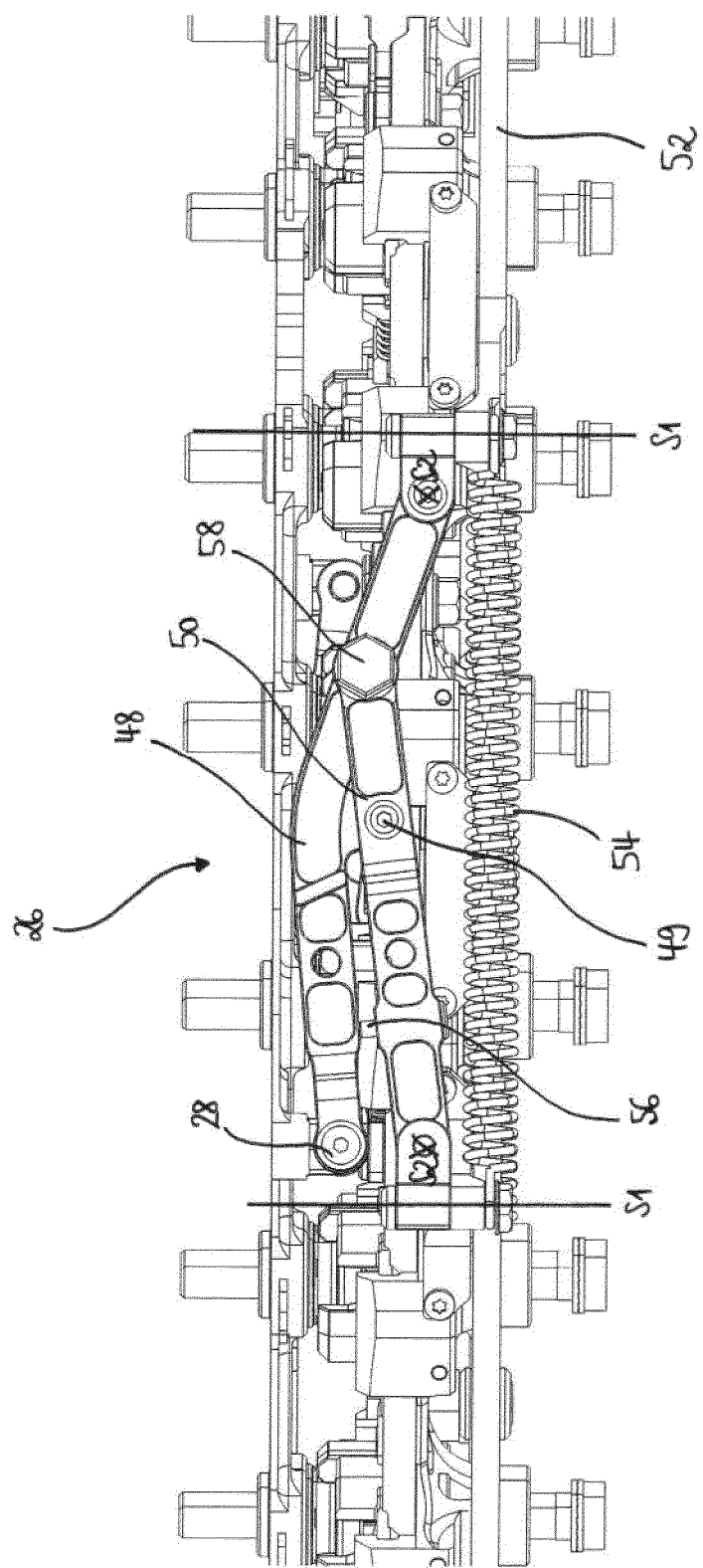
FIG. 4 shows a side view of a lever mechanism of a deployment means of the separation system in a holding position.

FIG. 1 shows the lever mechanisms in a release state in which they adopt a shape resembling a reversed Y. In the region of respective first ends, both the first and second levers 48, 50 are mounted to the first ring 22 either directly, or indirectly to components attached thereto. In particular, the first ends of the second levers 50 are connected to the first ring 22, while the first ends of the first levers 48 are connected to a third actuating ring 52, which is rotatably attached to and coaxial with the first ring 22. The third actuating ring 52 rotates back and forth when the scissor-like lever mechanisms move between an open (FIG. 1) and a closed state (FIG. 4).

Figure 3:
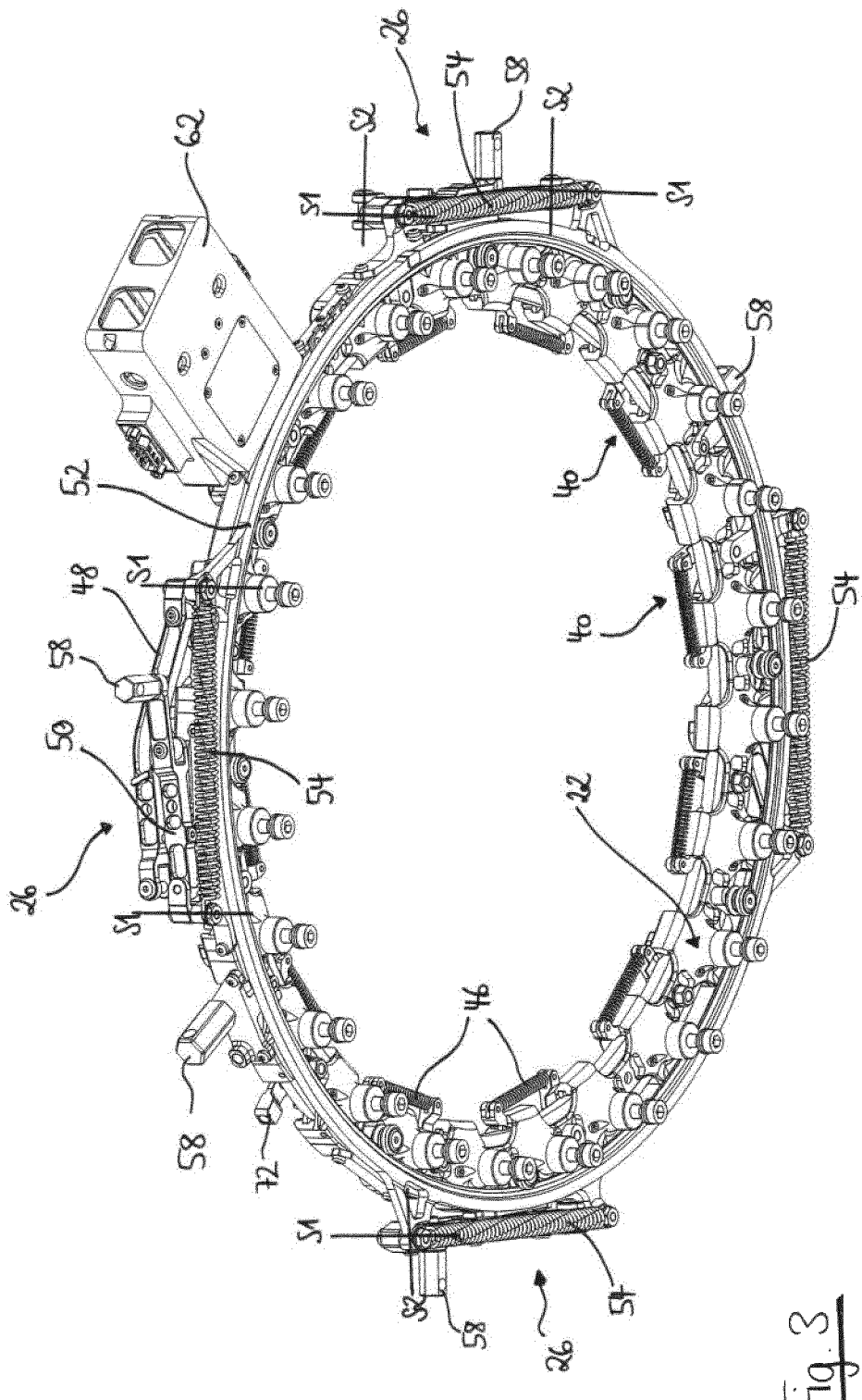
FIG. 3 shows a perspective bottom view of the part of the separation system of FIG. 2.

As shown in FIGS. 1 to 3, the separation system 20 comprises four lever mechanisms distributed evenly around the circumference of the first ring 22. Simultaneous operation of the four lever mechanisms ensures linear deployment of the satellite along the dispensing axis D, i.e. perpendicular to the plane of the first ring 22, without inducing any tilting moments by the separation system 20. The second ends of the first levers 48 each form a point of contact 28 with the second ring 24 and thus exert the separating force of the deployment means 26 onto the second ring 24 during dispensing of the satellite in orbit.

The deployment means 26 further comprises a first group of springs 54 and a second group of springs 56. The springs 54 of the first group have a spring force which is different from the spring force of the springs 56 of the second group. The springs 54 and 56 each define a longitudinal axis along which a compression of the spring occurs upon preloading. The longitudinal axis of each spring 54 of the first group and of each spring 56 of the second group is arranged tangentially to the first ring 22. In particular, the longitudinal axes of the first group of springs 54 are oriented parallel to the plane of the first ring 22, while the longitudinal axes of the second group of springs 56 are oriented in a plane tangential to the first ring 22 and parallel to the dispensing axis D.

FIG. 1 shows the first group of springs 54 in a relaxed state corresponding to the release state of the separation system. In this position the second ring 24 is removable from the first ring 22. The first group of springs 54 connects the first ring 22 to the third actuating ring 52, which is best seen in FIG. 3. In the present embodiment, the springs 54 of the first group are coupled to the first ring 22 in the region of the connection points of the second levers 50 and the first ring 22 and coupled to the third actuating ring 52 in the region of the connection points of the first levers 48 and the third actuating ring 52. However, it is also possible to position the first group of springs 54 at other positions around the circumference of the first ring 22 and the actuating ring 52.

The first group of springs 54 acts as an actuator for the rotation of the third actuating ring 52 relative to the first ring 22. Ultimately, all of the first and second levers 48, 50 of the lever mechanisms of the deployment means 26 are coupled to each other via mechanical restricted guidance by means of the first ring 22 and the third actuating ring 52, i.e. a movement of one of the levers 48, 50 is immediately transferred to all the other levers 48, 50 via the rings 22, 52.

A spring 56 of the second group can, for example, be seen in FIG. 4 which shows a detailed side view of a lever mechanism of the deployment means 26 in a holding state. The springs 56 of the second group operate as starter springs and assist initial operation of the lever mechanisms upon deployment of the satellite. The starter springs 56 are arranged on one arm of each of the second levers 50 and, in the holding state, they are compressed against a restoring force by the associated first levers 48. In turn, the starter springs 56 exert a spring force onto the associated first lever 48. Alternatively, the starter springs 56 may be arranged on the first levers 48 or on both the first and second levers 48, 50.

The first ends of the first levers 48 and the first ends of the second levers 50 are each mounted rotatably about two axes S1 and S2 which are perpendicular to each other. Thus, when the springs 54 of the first group go from a relaxed to a preloaded state, or vice versa, and in this process change their longitudinal extension (FIGS. 5 and 6), the longitudinal axes of the first group of springs 54 remains oriented tangential to the first ring 22.

FIG. 2 depicts the separation system 20 in the transport or holding state. Transition from the release state of FIG. 1 to the transport state of FIG. 2 includes the following steps:

The deployment means 26 are brought into the transport state by folding the lever mechanisms into a closed state, e.g. by aligning the second ring 24 with the contact points 28 of the deployment means 26 and pushing the second ring 24 downwards onto the first ring 22. The coupling pins 38 of the second ring 24 are thus brought into the fixed receptacles 34 and between the coupling brackets 32a, 32b of the coupling devices of the first ring 22.

By this, the first group of springs 54 are extended in length and thus preloaded by a rotation of the third actuating ring 52 relative to the first ring 22 (FIG. 3). The arms of the first and second levers 48 and 50 come into close alignment with each other and the second group of springs 56 are compressed and, thus, preloaded by the first levers 48. A suitably designed tool may be used to assist transfer of the deployment means 26 into the holding position and to thereby preload the first group of springs 54 and the second group of springs 56 (FIG. 4). In this holding state, the first ends of the first lever 48, the central pivot 49 and the first end of the second lever 50, are nearly aligned with each other. Thus, in this holding state the lever mechanism is at least approximately in an equilibrium state.

In order to secure the deployment means 26 in its holding position, securing bolts 58 are inserted into openings 60 of the first lever 48 and second lever 50 as well as of the first ring 22 and the third actuating ring 52. The securing bolts 58 prevent movement of the third actuating ring 52 relative to the first ring 22, and prevent actuation of the deployment means 26 by the first and second group of springs 54, 56. Prior to transport of the separation system 20 into orbit, the securing bolts 58 are removed.

Moving the coupling brackets 32a, 32b into a closed configuration is effected by a rotation of the outer and inner actuating rings 36a and 36b in opposite directions by pivoting of the operating levers 42. To this end, lever extensions (not shown) may be attached to appendices 72 of the operating levers 42, which are located on opposite sides of the first ring 22. By operating the lever extensions, simultaneous preloading of all release springs 46 and closing of all coupling brackets 32a, 32b is achieved.

In order to secure the operating levers 42 in the holding position in spite of the spring force exerted on the operating levers 42 by the preloaded release springs 46, the separation system 20 comprises a starter mechanism 62, which is coupled to one of the operating levers 42. The operation of the starter mechanism 62 can be taken from FIGS. 5 and 6. The starter mechanism 62 comprises a blocking bolt 64, which secures the associated operating lever 42 in its holding position (FIG. 5). Due to direct coupling of all operating levers 42 by means of the outer and inner actuating rings 36a and 36b, all operating levers 42 and thus the release means 40 are fixated in the holding position. The blocking bolt 64 is held in place by a first magnet 66a cooperating with a first magnetic plate 70a provided on a first arm of a rocker lever 68 and a second magnet 66b cooperating with a second magnetic plate 70b provided on a second arm of the rocker lever 68. The rocker lever 68 is connected to the blocking bolt 64 by a rod 69, which holds the blocking bolt 64 in a position that blocks the movement of the operating lever 42 when the first and second magnets 66a and 66b hold the first and second magnetic plates 70a and 70b. The first and second magnets 66a, 66b may be permanent magnets, generating a holding force without any energy input.

Starting from the transport state of the separation system 20, the deployment of the second ring 24 is effected as follows: Initiation of the deployment is induced by the starter mechanism 62 as shown in FIG. 6. The magnetic field of the first magnet 66a is decreased, e.g. by means of an electrically induced opposing field, reducing or cancelling the holding force exerted by the first magnet 66a on the first magnetic plate 70a and allowing the rocker lever 68 to rotate, for example by means of a spring 71, and release the blocking bolt 64. Redundancy is built into the starter mechanism 62 by the second arm of the rocker lever 68: During deployment of the satellite, the separation system 20 may be programmed to release both arms of the rocker lever 68 independently of each other in succession. If the first arm of the rocker lever 68 fails to release the blocking bolt 64, the other arm may be activated.

The operating lever 42 previously held by the blocking bolt 64 is released and the preloaded release springs 46 relax simultaneously around the whole circumference of the separation system 20. Because of the resulting simultaneous pivoting of the operating levers 42, the outer and inner actuating rings 36a, 36b rotate in opposite circumferential directions, thereby moving the coupling brackets 32a, 32b into their open configurations simultaneously around the whole circumference of the separation system 20.

Thus, the holding force of the coupling brackets 32a, 32b on the coupling pins 38 is cancelled and the preloaded springs 54, 56 of the deployment means 26 are allowed to relax. The group of starter springs 56 immediately exerts their full spring force onto the first levers 48 of the deployment means 26. Thereby, the lever mechanism is smoothly moved out of its equilibrium state so that the first group of springs 54 actuate the deployment means 26 to transition into the release position as depicted in FIG. 1. In this release position the second ring 24, is not connected with the first ring 22 and will be lifted due to the spring forces, thereby dispensing the second ring 24 together with the satellite.

A travel of the levers 48, in particular of the contact points 28, between their holding position and their release position along the dispensing axis D is preferably greater than the stroke of the spring 54 of the first group. Thus, as a result of the lever mechanism the spring force exerted by the first group of springs 54 is applied over a longer travel and thus more smoothly to the second ring 24 as compared to an arrangement of a spring directly acting between the first ring 22 and the second ring 24.

Along the dispensing axis D, a maximum travel of the second ring 24 with respect to the first ring 22 between its holding position and its release position is least 4 cm, preferably at least 6 cm, and in particular up to 8 cm. Due to the geometry of the lever mechanism of the deployment means 26, the separating force exerted by the deployment means 26 increases upon release. Starting from at least approximately an equilibrium position of the lever mechanism, the separating force directed along the dispensing axis D is small in the beginning of the deployment and increases during the deployment process, thereby ensuring smooth and successful dispensing of the satellite into orbit.

LIST OF REFERENCE NUMERALS 20 separation system
22 first ring
24 second ring
26 deployment means
28 contact points
30 holding devices
32a outer coupling bracket
32b inner coupling bracket
34 fixed receptacle
36a outer actuating ring
36b inner actuating ring
38 coupling pins
40 release means
42 operating lever
44 pivot of operating lever
46 release springs
48 first lever
49 central pivot of lever mechanism
50 second lever
52 third actuating ring
54 first group of springs
56 starter springs
58 securing bolts
60 opening
62 starter mechanism
64 blocking bolt
66a first magnet
66b second magnet
68 rocker lever
69 rod
70a first magnetic plate
70b second magnetic plate
71 spring of the starter mechanism
D dispensing axis
S1 first swivelling axis
S2 second swivelling axis

The invention claimed is:

1. A separation system that dispenses a satellite from a launch vehicle along a dispensing axis, the separation system comprising:
    a first ring for mounting to the launch vehicle;
    a second ring for mounting to the satellite;
    a holding mechanism interconnecting the first ring and the second ring in a holding position, wherein the holding mechanism includes a coupling pin affixed to the second ring and a coupling pin holding device affixed to the first ring, wherein the coupling pin holding device is operable to releasably hold the coupling pin;
    a lever deployment mechanism exerting a separating force on the first and the second ring during a deployment process, wherein an initial magnitude of the separating force is less than a maximum magnitude of the separating force during the deployment process, such that the separating force increases during at least a portion of the deployment process; and
    an actuating ring release mechanism that initiates the deployment process by actuating the coupling pin holding device to release the coupling pin.

2. The separation system according to claim 1, wherein the lever deployment mechanism comprises a first group of springs and a second group of springs, the springs of the first group having a spring force which is different as compared to the spring force of the springs of the second group.

3. The separation system according to claim 1, wherein at least one actuating ring is slidably attached to the first ring.

4. The separation system according to claim 1, wherein at least two actuating rings are slidably attached to the first ring, and wherein the actuating ring release mechanism drives said two actuating rings in opposite directions.

5. The separation system according to claim 1, wherein the holding mechanism comprises a plurality of coupling pins distributed along a circumference of the second ring and a plurality of coupling pin holding devices distributed along a circumference of the first ring.

6. The separation system according to claim 5, wherein each of the plurality of coupling pin holding devices comprises two coupling brackets moveable in opposite directions.

7. The separation system according to claim 6, wherein each of the plurality of coupling pin holding devices comprises a fixed receptacle between said coupling brackets, wherein the fixed receptacle is configured to receive one of the plurality of coupling pins.

8. The separation system according to claim 1, wherein a plurality of operating levers is mounted pivotally at the first ring, the plurality of operating levers driving two actuating rings slidably attached to the first ring in opposite directions.

9. The separation system according to claim 8, wherein the separation system comprises a starter mechanism including a blocking bolt preventing actuation of one of the pluraliity of operating levers, said starter mechanism operable to retract the blocking bolt thereby actuating said one of the plurality of operating levers.

10. The separation system according to claim 1, wherein the lever deployment mechanism comprises a first lever and a second lever pivotally connected to each other.

11. The separation system according to claim 1, wherein a first group of springs connects the first ring and an actuating ring slidably attached to the first ring.

12. The separation system according to claim 10, wherein in the holding position a starter spring arranged on one of the first and the second lever exerts a spring force onto the other of the first and the second lever.

13. The separation system according to claim 12, wherein the starter spring is arranged in a tangential plane of the first ring.

14. The separation system according to claim 10, wherein a first end of the first lever and a first end of the second lever are each mounted swiveling around two perpendicular axes.

15. The separation system according to claim 2, wherein a longitudinal axis of each of the springs of the first group and each of the springs of the second group is arranged tangentially to the first ring.

16. The separation system according to claim 1, wherein, along the dispensing axis, a maximum travel of the second ring with respect to the first ring between the holding position and a release position is least 4 cm.

17. A separation system for dispensing a satellite from a launch vehicle along a dispensing axis, the separation system comprising:

a first ring for mounting to the launch vehicle;
a second ring for mounting to the satellite;
a holding mechanism interconnecting the first ring and the second ring in a holding position, wherein the holding mechanism includes a coupling pin affixed to the second ring and a coupling pin holding device affixed to the first ring, wherein the coupling pin holding device is operable to releasably hold the coupling pin;
a lever deployment mechanism including at least one spring, wherein a first end of the lever deployment mechanism is affixed to the first ring, wherein a second end of the lever deployment mechanism releasably supports the second ring at the second end until separation of the satellite, and wherein the lever deployment mechanism is operable to exert a separating force between the first ring and the second ring using the at least one spring; and
an actuating ring release mechanism that actuates the coupling pin holding device to release the interconnection of the first and second ring.

18. The separation system according to claim 17, wherein all levers of the lever deployment mechanism are coupled via mechanical restricted guidance.

19. The separation system according to claim 17, wherein a travel of a lever of the lever deployment mechanism along the dispensing axis is greater than a travel of the at least one spring.

20. The separation system according to claim 17, wherein the separating force exerted by the lever deployment mechanism increases upon release.

* * * * *